RICE & CONGDON.
Machine for Thrashing, Grinding Corn, &c.
No. 277.    Patented July 17, 1837.
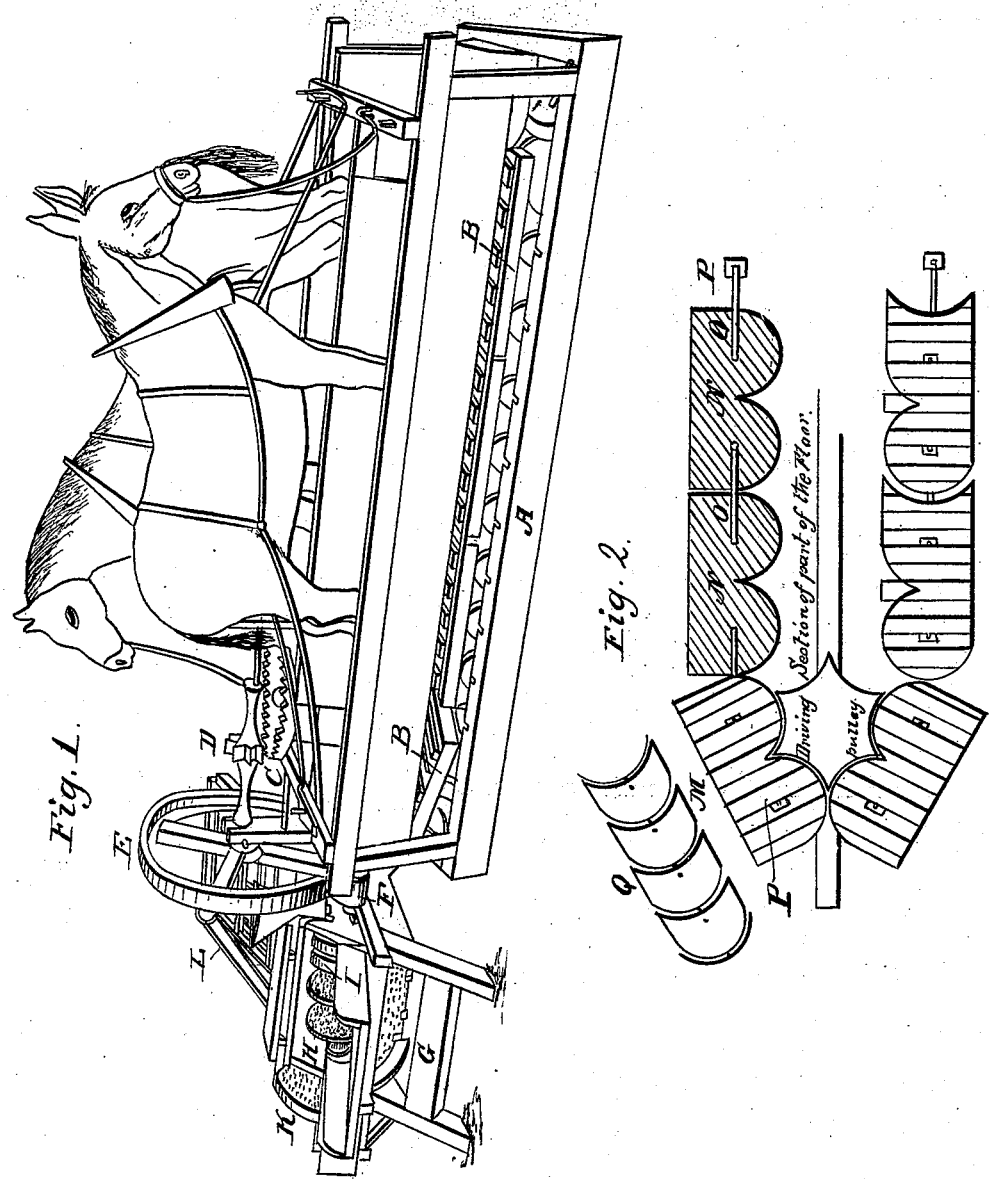

UNITED STATES PATENT OFFICE.

LEVI RICE AND DANL. CONGDON, OF WEST CHESTER, PENNSYLVANIA.

APPLICATION OF HORSE-POWER.

Specification of Letters Patent No. 277, dated July 17, 1837.

*To all whom it may concern:*

Be it known that we, LEVI RICE and DANIEL CONGDON, of West Chester, Chester county, State of Pennsylvania, have invented a new Application of Horse-Power; and we do hereby declare that the following is a full and exact description.

The new application of horse-power consists in an horizontally revolving floor, working on three, or more, vertical shafts.

In order to construct the horizontally revolving floor; a frame (A,) may be made, larger or smaller, according to the number of horses wanted, or power required, a beam, extending lengthwise of the frame, supports the upright shafts; and forms a division between the horses, that walk on the floor (B,) and draw reverse ways. The driving pulley, around which the floor revolves, is made with points or cogs, so formed as to fit into the inner side of the planks, forming the floor. The floor is made of pieces of plank, of sufficient length and width to allow a horse to walk upon, and formed at the ends, and inner side, in segments of circles, (as M, and Q,) or in any other shape, so that the principle is preserved; and are connected by staples, (O,) made of half inch iron, passing through the plank; and held (loosely) on the upper side, by a screw, and nut (P) thereby making a joint, to allow the floor to revolve around the pulleys; which floor has cleets, for the horses to walk upon; and is supported by friction wheels, attached to the floor.

On the driving shaft is placed a cog wheel (C,) meshing into a pinion (D) on the shaft of the large pulley (E) which gives motion to a thrashing machine or for any other purpose required.

What we claim and wish to secure to ourselves, by Letters Patent, is—

The constructing of a horizontally revolving floor, with three or more centers; making it in the form of an oblong, triangular, or square figure, for two, three, or more horses; and the right of shaping the ends, and sides, of the planks in any form we please, so that the plurality of centers is preserved in the floor; for the purpose of propelling rail-road cars, thrashing machines, &c.

June 20, 1837.

LEVI RICE.
DANIEL CONGDON.

Witnesses:
GEORGE MEREDITH,
YARNELL BAILY.